(12) United States Patent
Pursche

(10) Patent No.: US 9,133,706 B2
(45) Date of Patent: Sep. 15, 2015

(54) GAUGE FOR USE IN WIRED-PIPE TELEMETRY APPLICATIONS

(71) Applicant: Peter Pursche, Apache Junction, AZ (US)

(72) Inventor: Peter Pursche, Apache Junction, AZ (US)

(73) Assignee: Sonic Aerospace, Inc., Chandler, AZ (US)

( * ) Notice: Subject to any disclaimer, the term of this patent is extended or adjusted under 35 U.S.C. 154(b) by 171 days.

(21) Appl. No.: 13/918,107

(22) Filed: Jun. 14, 2013

(65) Prior Publication Data

US 2014/0091944 A1    Apr. 3, 2014

Related U.S. Application Data

(60) Provisional application No. 61/660,243, filed on Jun. 15, 2012.

(51) Int. Cl.
  *G01B 5/02* (2006.01)
  *E21B 47/12* (2012.01)

(52) U.S. Cl.
  CPC .. *E21B 47/12* (2013.01); *G01B 5/02* (2013.01)

(58) Field of Classification Search
  CPC ............ G01B 5/02; G01B 7/13; E21B 47/12; E21B 47/08
  USPC ................................. 33/302, 303, 542, 544.2
  See application file for complete search history.

(56) References Cited

U.S. PATENT DOCUMENTS

| | | | | |
|---|---|---|---|---|
| 4,033,043 A | * | 7/1977 | Cunningham | 33/806 |
| 4,385,446 A | * | 5/1983 | Roch et al. | 33/544.6 |
| 5,065,524 A | * | 11/1991 | Langowski et al. | 33/544.2 |
| 6,131,299 A | * | 10/2000 | Raab et al. | 33/503 |
| 8,489,333 B2 | * | 7/2013 | Bonavides et al. | 33/304 |
| 2002/0163441 A1 | * | 11/2002 | Hill et al. | 340/855.4 |
| 2006/0096105 A1 | * | 5/2006 | Haugland | 33/304 |
| 2008/0294343 A1 | * | 11/2008 | Sugiura | 33/313 |
| 2012/0305313 A1 | * | 12/2012 | DiFoggio | 33/306 |
| 2015/0109138 A1 | * | 4/2015 | Shanks | 340/854.9 |

* cited by examiner

*Primary Examiner* — G. Bradley Bennett
(74) *Attorney, Agent, or Firm* — Buchalter Nemer

(57) ABSTRACT

A gauge assembly that is utilized for wired-pipe telemetry, has been developed where the gauge assembly includes: a trigger, a push rod, wherein the rod is operatively coupled with the trigger, a bearing housing assembly, wherein the bearing housing assembly is operatively coupled with the push rod, an indicator, wherein the indicator is operatively coupled with the push rod, a base plate assembly, and a sensor device, stylus or combination thereof that is both operatively coupled with the push rod and the indicator. Methods of use are also disclosed.

13 Claims, 4 Drawing Sheets

| A method of determining the internal condition of a wired-pipe 400 includes |

↓

| providing the gauge assembly contemplated herein, coupling the sensor device, stylus or combination thereof with a wired-pipe, pipe or combination thereof opening 410 |

↓

| and collecting information using the sensor device, stylus or combination thereof, wherein the information is related to the dimension, tolerance, condition or a combination thereof of the internal portion of the pipe 420 |

FIGURE 4

GAUGE FOR USE IN WIRED-PIPE TELEMETRY APPLICATIONS

This United States Utility Application claims priority to U.S. Provisional Patent Application Ser. No. 61/660,243 filed on Jun. 15, 2012 and entitled "Gauge for Use in Wired-Pipe Telemetry Applications", which is commonly-owned and incorporated herein in its entirety by reference.

FIELD OF THE SUBJECT MATTER

The field of the subject matter is devices for use in wired-pipe telemetry applications, including those used in the oil and gas industry.

BACKGROUND

Machinery, pipes and parts used in the oil and gas industry are designed and built for precision. Despite the fact that these rigs are the size of small cities and that the extraction pipes can be miles long, some of the connections need to be precise down to the tenths or hundredths of inches. In addition, as these parts and systems become more complicated, tighter tolerances are demanded.

One of these areas of complication is wired-pipe telemetry, which is basically coupling data transmissions and "communication" between the various deep-level systems and the surface. Many of these systems rely on the ability to have precise tolerances and stability. To this end, it is important to develop devices and gauges that assist in that goal.

FIG. 1 graphically outlines the concept of wired-pipe telemetry. As mentioned, it is imperative that measurements are precise and accurate in conditions that may be challenging. The wired pipe 110 is shown extending from an oil rig 120, in this Figure, where the wired pipe has a Repeater every 500 m 130, and utilizes inductive coupling 140. The connection between the BNA subnet and the wired pipe is also shown 150. Data acquisition 170 is performed from the top-drive or elevator 160.

Therefore, it would be ideal to a) develop a gauge that will be suitable for wired-pipe telemetry applications in any field, b) provide versatility in contemplated gauges in order to measure at least one, and in many instances more, depths, diameters and internal measurements, and c) develop a gauge that is reliable over many uses and in different environmental conditions.

SUMMARY OF THE SUBJECT MATTER

A gauge assembly that is utilized for wired-pipe telemetry, has been developed where the gauge assembly includes: a trigger, a push rod, wherein the rod is operatively coupled with the trigger, a bearing housing assembly, wherein the bearing housing assembly is operatively coupled with the push rod, an indicator, wherein the indicator is operatively coupled with the push rod, a base plate assembly, and a sensor device, stylus or combination thereof that is both operatively coupled with the push rod and the indicator.

A method of determining the internal condition of a wired-pipe is also described where the method includes: providing the gauge assembly contemplated herein, coupling the sensor device, stylus or combination thereof with a wired-pipe, pipe or combination thereof opening, and collecting information using the sensor device, stylus or combination thereof, wherein the information is related to the dimension, tolerance, condition or a combination thereof of the internal portion of the pipe.

BRIEF DESCRIPTION OF THE FIGURES

FIG. 4 shows a contemplated method.

DETAILED DESCRIPTION

Figure 1:
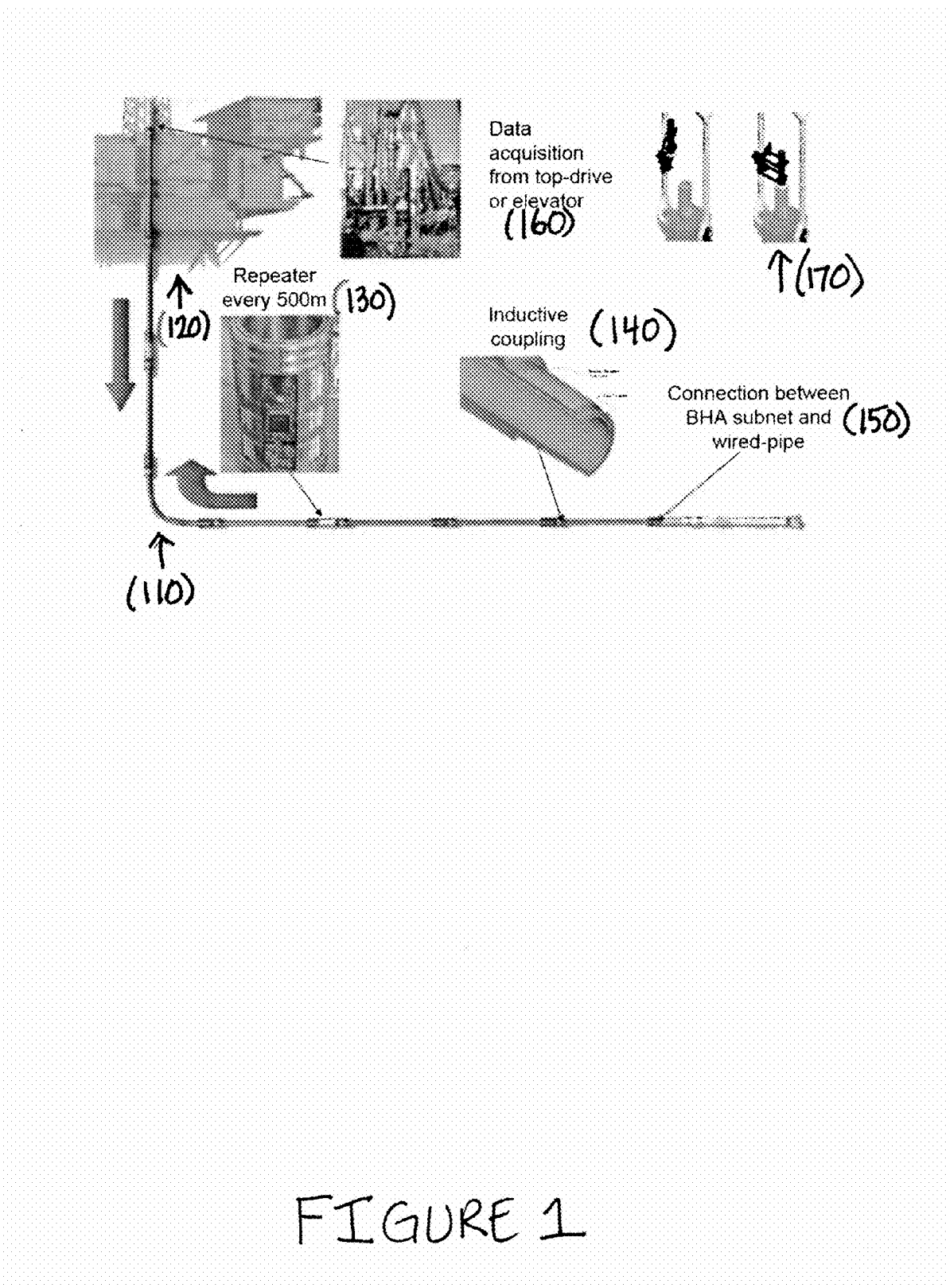
FIG. 1 shows a contemplated flow chart for wired-pipe telemetry.

A wired-pipe telemetry gauge has been developed that: a) is suitable for wired-pipe telemetry applications in any field, b) is versatile with respect to contemplated gauges in order to measure at least one, and in many instances more, depths, diameters and internal measurements, and c) is reliable over many uses and in different environmental conditions.

Specifically, a gauge assembly that is utilized for wired-pipe telemetry, has been developed where the gauge assembly includes: a trigger, a push rod, wherein the rod is operatively coupled with the trigger, a bearing housing assembly, wherein the bearing housing assembly is operatively coupled with the push rod, an indicator, wherein the indicator is operatively coupled with the push rod, a base plate assembly, and a sensor device, stylus or combination thereof that is both operatively coupled with the push rod and the indicator.

A method 400 of determining the internal condition of a wired-pipe is also described and shown in FIG. 4, where the method includes: providing the gauge assembly contemplated herein, coupling the sensor device, stylus or combination thereof with a wired-pipe, pipe or combination thereof opening 410, and collecting information using the sensor device, stylus or combination thereof, wherein the information is related to the dimension, tolerance, condition or a combination thereof of the internal portion of the pipe 420.

Contemplated gauge assembles can be utilized for a number of processes, including determining groove and tolerance measurements for new pipe, groove and tolerance measurements for failed pipe or a combination thereof. In this instance, the gauge assembly is used in the inspection process to determine groove and tolerances for both good pipe and pipe that has failed. In the latter instance, it is important to help technicians understand why the pipe failed, and contemplated gauge assemblies may be able to provide information in that regard. Contemplated gauge assemblies may be used for brand new pipe to determine the manufactured dimensions, and in an effort to help with quality control, to determine if it is acceptable to send to the field to be installed. To this end, contemplated gauges may also be used in the field to check to see if the pipe is being installed correctly and/or if the pipe has been screwed in too tightly or too loosely—both of which may affect the dimensions.

Contemplated gauge assemblies comprise a trigger assembly, wherein the trigger assembly comprises a trigger, a trigger base, a trigger axle and a handle. A contemplated trigger assembly may be entirely manual, in that the user physically engages the trigger with his/her hand, may be partially automated, in that the trigger can be engaged both by the user's hand or by a remote computer system, or may be fully automated, in that it is entirely engaged by a remote computer. Above or near the trigger assembly an indicator is located. In some embodiments, the indicator comprises a digital readout. In other embodiments, the indicator is operatively coupled, communicatively coupled or a combination thereof with a computer system. In some embodiments, the indicator is operatively coupled, communicatively coupled or a combination thereof with a computer system through a wireless network.

Contemplated gauge assemblies comprise a push rod, wherein the push rod moves vertically up and down within the gauge assembly. In some embodiments, the push rod moves vertically up and down within a channel assembly. A contemplated bearing housing assembly provides lateral and longitudinal support to the push rod. The push rod is coupled to a sensing device that is used to provide information back to the indicator and to the user, as to the condition of the pipe. A contemplated sensing device may comprise any suitable material or technology that is being used at the time and contains the sensitivity necessary for these types of measurements.

Figure 2:
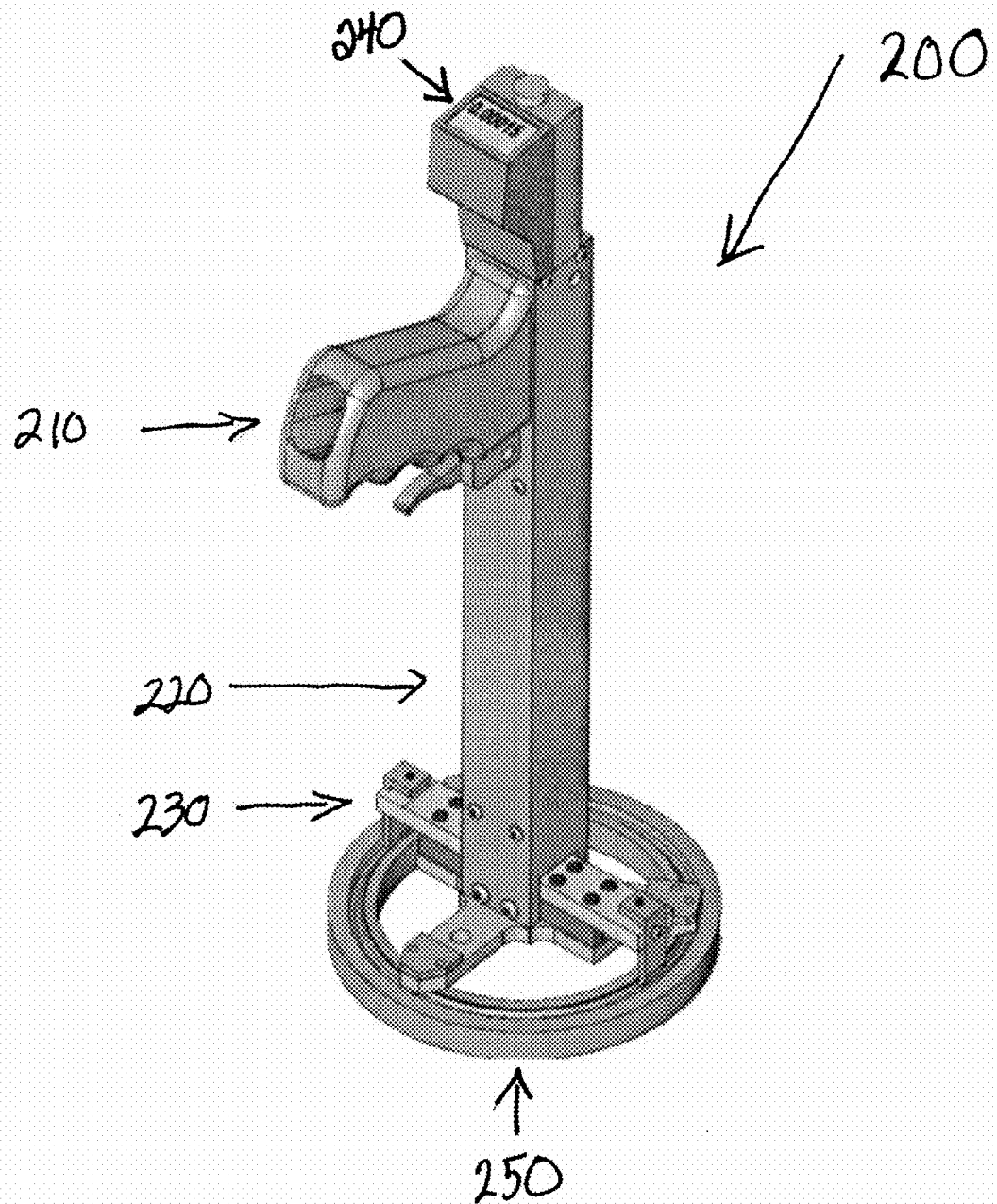
FIG. 2 shows a contemplated gauge.
Figure 3:
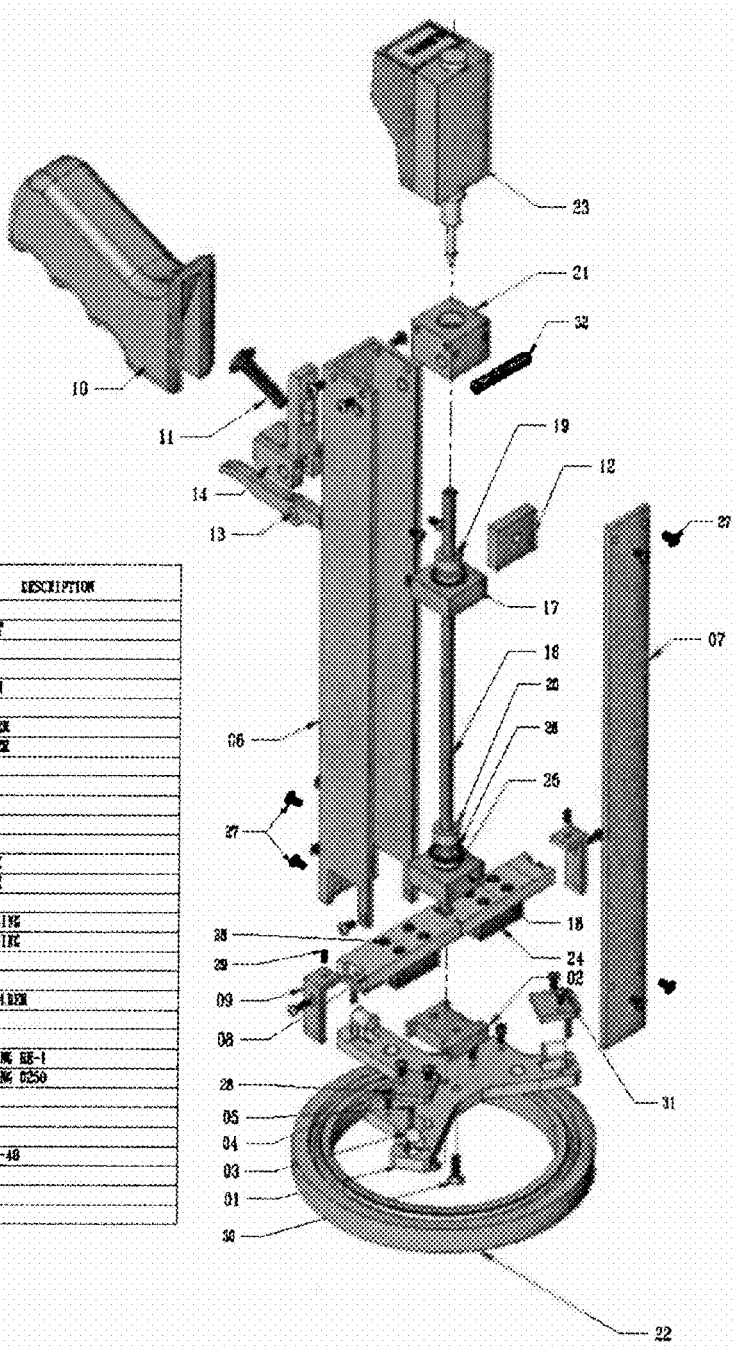
FIG. 3 shows an exploded view of the contemplated gauge of FIG. 2.

FIGS. 2 and 3 show a contemplated wired-pipe telemetry gauge and an exploded view of the same gauge, respectively, that is utilized to measure the diameter of the 18-degree angle at the 0.68" and/or 0.100" gauge point depths to maintain the 18-degree angle in the wired-pipe coil groove. In these contemplated embodiments, an absolute 18-degree angle must be maintained to prevent the loss of the communication connection throughout the length of the wired-pipe. The precise 18-degree angle, in these embodiments, keeps the electronic coil, which is the wired-pipe's communication source, from popping out of the coil groove and losing communication to the adjoining male and female wired-pipe inductive coupling connection. It is contemplated, however, that as wired-pipe telemetry is advanced and redesigned, additional pipe angles and depth points may be suitable. In these additional embodiments, contemplated gauges can accommodate to those additional design specifications and adapt accordingly.

As stated, contemplated devices and gauges may be designed and utilized in any suitable wired-pipe telemetry system, despite the particular angles and tolerances required at the time. The device shown in FIGS. 2 and 3 is to measure the 18-degree angle required at this time, but this device can be easily redesigned to accommodate other angles in similar systems. It should also be understood that these devices and gauges can be utilized in any similar system where wired-pipe telemetry is included to help provide a communications and data link from various points in a long pipe structure.

FIG. 2 shows a contemplated gauge assembly 200 that is utilized for wired-pipe telemetry, has been developed where the gauge assembly includes: a trigger assembly 210, a push rod (not shown) located in a channel 220, wherein the rod is operatively coupled with the trigger 210, a bearing housing assembly 230, wherein the bearing housing assembly is operatively coupled with the push rod, an indicator 240, wherein the indicator is operatively coupled with the push rod, a base plate assembly 250, and a sensor device, stylus or combination thereof that is both operatively coupled with the push rod and the indicator.

FIG. 3 shows an exploded view of a contemplated gauge. This view shows a base plate 01, a base bracket 02, at least three pins 03, at least three pin covers 04, at least three position pins 05, a channel 06 and a corresponding channel cover 07, at least two stylus 09 and at least two corresponding stylus holders 08, a grip 10, a screw 11, a lock plate 12, a trigger 13, a corresponding trigger base 14 and trigger axle 15, a push rod 16, at least two bearing housings 17 and 18, a rod pusher 19, a rod stop 20, an indicator holder 21, a set master 22, an indicator 23, at least two linear bearings 24 and 25, at least 4 lock rings 26, a plurality of screws or couplers 27, 28, 30 and 31, at least two set screws 29 and a clamp assembly 32. It should be understood that, depending on the design, some of these parts may be utilized in smaller or larger quantities or may not be necessary at all, if the design has been so streamlined.

Thus, specific embodiments, methods of use and production of devices and gauges for use in the oil and gas industry have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A gauge assembly that is utilized for wired-pipe telemetry, wherein the gauge assembly comprises:
a trigger assembly,
a push rod, wherein the rod is operatively coupled with the trigger,
a bearing housing assembly, wherein the bearing housing assembly is operatively coupled with the push rod,
an indicator, wherein the indicator is operatively coupled with the push rod,
a base plate assembly, and
a sensor device, stylus or combination thereof that is both operatively coupled with the push rod and the indicator.

2. The gauge assembly of claim 1, wherein the trigger assembly comprises a trigger, a trigger base, a trigger axle and a handle.

3. The gauge assembly of claim 1, wherein the push rod moves vertically up and down within the gauge assembly.

4. The gauge assembly of claim 1, wherein the push rod moves vertically up and down within a channel assembly.

5. The gauge assembly of claim 1, wherein the bearing housing assembly provides lateral and longitudinal support to the push rod.

6. The gauge assembly of claim 1, wherein the indicator comprises a digital readout.

7. The gauge assembly of claim 1, wherein the indicator is operatively coupled, communicatively coupled or a combination thereof with a computer system.

8. The gauge assembly of claim 1, wherein the indicator is operatively coupled, communicatively coupled or a combination thereof with a computer system through a wireless network.

9. The gauge assembly of claim 1, wherein the sensor device, stylus or combination thereof collects and sends information to the indicator as to the status of the pipe.

10. The gauge assembly of claim 1, wherein the assembly is used to determine groove and tolerance measurements for new pipe, groove and tolerance measurements for failed pipe or a combination thereof.

11. A method of determining the internal condition of a wired-pipe, the method comprising:
providing the gauge assembly of claim 1,
coupling the sensor device, stylus or combination thereof with a wired-pipe, pipe or combination thereof opening,
collecting information using the sensor device, stylus or combination thereof, wherein the information is related to the dimension, tolerance, condition or a combination thereof of the internal portion of the pipe.

12. The method of claim 11, wherein the gauge assembly is coupled with a remote computer system.

13. The method of claim 12, wherein the gauge assembly is wirelessly coupled with a remote computer system.

* * * * *